United States Patent
Bill, Jr. et al.

(10) Patent No.: US 7,754,175 B2
(45) Date of Patent: Jul. 13, 2010

(54) SILICON AND CATALYST MATERIAL PREPARATION IN A PROCESS FOR PRODUCING TRICHLOROSILANE

(75) Inventors: Jon M. Bill, Jr., Howe, IN (US); Carl W. Merkh, Sturgis, MI (US)

(73) Assignee: Dynamic Engineering, Inc., Sturgis, MI (US)

( * ) Notice: Subject to any disclaimer, the term of this patent is extended or adjusted under 35 U.S.C. 154(b) by 153 days.

(21) Appl. No.: 12/200,032

(22) Filed: Aug. 28, 2008

(65) Prior Publication Data

US 2009/0060818 A1 Mar. 5, 2009

Related U.S. Application Data

(60) Provisional application No. 60/968,679, filed on Aug. 29, 2007.

(51) Int. Cl.
*C01B 33/02* (2006.01)
*C01B 33/107* (2006.01)

(52) U.S. Cl. .................. 423/349; 423/341; 423/342; 423/348; 423/350

(58) Field of Classification Search ............. 423/341, 423/342, 348, 349, 350
See application file for complete search history.

(56) References Cited

U.S. PATENT DOCUMENTS

| 2,380,995 | A | | 8/1945 | Rochow |
| 3,933,985 | A | * | 1/1976 | Rodgers ............... 423/350 |
| 4,117,094 | A | | 9/1978 | Blocher, Jr. et al. |
| 4,424,198 | A | | 1/1984 | Ito et al. |
| 4,520,130 | A | | 5/1985 | Hashiguchi et al. |
| 4,676,967 | A | | 6/1987 | Breneman |
| 5,118,485 | A | * | 6/1992 | Arvidson et al. ........... 423/342 |
| 5,871,705 | A | | 2/1999 | Sakata et al. |
| 6,057,469 | A | | 5/2000 | Margaria et al. |
| 6,072,087 | A | * | 6/2000 | Fetzer et al. ............... 568/473 |
| 6,887,448 | B2 | * | 5/2005 | Block et al. ............... 423/349 |
| 7,056,484 | B2 | | 6/2006 | Bulan et al. |

FOREIGN PATENT DOCUMENTS

| DE | 4104422 | 8/1992 |
| EP | 0893408 | 1/1999 |
| EP | 1020472 | 7/2000 |
| JP | 1283817 | 11/1989 |

\* cited by examiner

*Primary Examiner*—Ngoc-Yen M Nguyen
(74) *Attorney, Agent, or Firm*—Taylor & Aust, P.C.

(57) ABSTRACT

A process for preparing trichlorosilane by reacting silicon with hydrogen chloride, or silicon tetrachloride with hydrogen in the presence of silicon, and catalysts where the silicon and catalysts are laminated together and reduced in particle size prior to reaction.

19 Claims, No Drawings

SILICON AND CATALYST MATERIAL PREPARATION IN A PROCESS FOR PRODUCING TRICHLOROSILANE

CROSS REFERENCE TO RELATED APPLICATIONS

This is a non-provisional application based upon U.S. provisional patent application Ser. No. 60/968,679, entitled "Silicon and Catalyst Material Preparation in a Process for Producing Trichlorosilane", filed Aug. 29, 2007, which is incorporated herein by reference.

MICROFICHE APPENDIX

Not Applicable.

GOVERNMENT RIGHTS IN PATENT

Not Applicable.

BACKGROUND OF THE INVENTION

1. Field of the Invention

The present invention relates to process for preparing trichlorosilane, and, more particularly, to a process of preparing trichlorosilane, in part, by lamination.

2. Description of the Related Art

The present invention relates to the field of preparing high purity trichlorosilane (abbreviated as TCS) from mixed silane stock.

TCS is a valuable intermediate product used to produce various silanes for electronics and adhesives. TCS, especially the high purity grade, is used in the electronics industry including use in the preparation of solar and electronics grade polycrystalline silicon, which produces silicon tetrachloride as a by-product.

The general process of preparing high purity TCS from silicon and hydrogen chloride, or from silicon tetrachloride and hydrogen in the presence of silicon and hydrogen chloride at relatively low temperatures is known from many patents, including, for example, U.S. Pat. Nos. 4,117,094 and 4,424,198 as well as CA A-1,162,028.

The use of alkaline salts as an aid to the selectivity of the reaction toward TCS is known, for example, from U.S. Pat. No. 5,871,705. Powdered copper catalysts have been used in this industry for this reaction for some time. The use of powdered copper or mixtures of copper metal, metal halides and bromides or iodides of iron, aluminum or vanadium is reported to react silicon with silicon tetrachloride, hydrogen and, if necessary, hydrogen chloride. See, for example, Chemical Abstracts CA 101, no. 9576d, 1984 and Chemical Abstracts CA 109, no. 57621b, 1988.

Copper oxide catalysts have been noted to be ground to particle sizes below 0.01 mm to improve reaction rates by providing as homogeneous distribution of catalyst on the silicon as possible. It has also been noted that potentially more effective catalysts such as, for example, metal chlorides, are generally not used because of the lack of availability in the required fineness of the associated particles.

As is known from, for example, DE 41 04 422 A1, silicon may be reacted with hydrogen chloride, or silicon tetrachloride may be reacted with hydrogen in a fluidized bed without using pressure in the presence of copper salts of a low, aliphatic, saturated dicarbon acid, particularly copper oxalate.

It is known to those of ordinary skill in the art that trichlorosilane is usually produced in a fluidized bed. There is a disadvantage to using such a fluidized bed with copper catalysts and/or catalyst mixtures containing copper because very often small catalyst particles are carried out of the fluidized bed. This results in a significant decrease in the yield of the desired trichlorosilane in the course of the process, and new and/or additional catalyst must be introduced. Losing catalyst in this fashion causes additional economic costs, particularly when copper catalyst is used, since copper catalyst is comparatively expensive.

What is needed in the art is a method for producing trichlorosilane that is characterized by a high reaction velocity and a high space-time yield respectively.

SUMMARY OF THE INVENTION

The present invention provides an advantageous the preparation of catalysts and silicon by providing intimate contact of silicon with the catalysts thereby allowing associated reactions to occur in a smaller volume, thereby decreasing size requirements of reactor yields, as well as substantially decreasing a yield of undesirable by-products. Further allowing reactions to occur in smaller volume reduces size requirements of downstream purification equipment.

Other features and advantages of the invention will become apparent to those skilled in the art upon review of the following detailed description and claims.

Before the embodiments of the invention are explained in detail, it is to be understood that the invention is not limited in its application to the details of construction and the arrangements of the components set forth in the following description. The invention is capable of other embodiments and of being practiced or being carried out in various ways. Also, it should be understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE INVENTION

The various exemplary embodiments of the present invention can be used with different variations of processes for preparing trichlorosilane from silicon, and perhaps other processes as well. For example, the present invention may be used in a process in which silicon is reacted with hydrogen chloride, or in a process in which silicon tetrachloride is reacted with hydrogen in the presence of silicon and optionally with hydrogen chloride.

In the various exemplary embodiments of the present invention, silicon and one or more catalysts are laminated together by pressing, to intermingle the crystalline structures, with the apparent result of improving selectivity in subsequent reactions of the process. It is believed that by employing the present invention, substantially less catalyst will be required than in accordance with previous similar processes.

The silicon and catalyst laminate to be employed according to the various exemplary embodiments of the present invention can be produced, for example, by pressing silicon in a press together with the desired catalyst; the silicon and the catalyst being fed into the press together or successively. A roller press has been found effective in producing the silicon/catalyst laminate desired herein.

In a preferred embodiment in which the silicon is pressed together with the desired catalyst, the silicon is preferably metallurgical silicon.

Suitable catalysts are, for example, copper catalysts and/or iron catalysts. Preferred copper catalysts are, for example, copper or compounds of copper. Preferred compounds of copper include copper oxide containing copper with the oxidation number of 1 or 2, as, for example, copper chloride, e.g. cuprous chloride or cupric chloride. Preferred iron catalysts are, for example, iron or compounds of iron. Preferred compounds of iron include, for example, iron chloride. More particularly, the compounds of iron are ferrous chloride and ferric chloride.

It is also possible to use mixtures of copper catalysts and/or iron catalysts with further catalytically active components. Such catalytically active components are, for example, metal halogenides, such as, for example, chlorides, bromides or iodides of aluminum, vanadium or antimony.

After laminating the silicon and catalyst together, the resulting silicon/catalyst laminate is then reduced in size, preferably in a mill. Exemplary devices for reducing the particle size include, for example, a hammer mill, a roller mill or a ball mill. Other types of mills and/or crushers can also be used. Reduction of the particle size is carried out so that, for example, a resulting silicon/catalyst mixture has an average particle size less than about 5 mm, preferably from about 0.001 mm to about 1.0 mm, and more preferably of about 0.2 mm to about 0.6 mm.

It is desired that device for reducing the particle size is composed of a material selected such that particles produced by the attrition of the device itself during milling provide further catalytically active material into the silicon/catalyst mixture. Suitable compositions for the device are, for example, copper, iron, and alloys of these metals with each other or with other metals such as, for example, brass or bronze. Devices made of other materials are also suitable. For example devices for reducing the particle size may include a ceramic coating such as tungsten carbide.

Preferably the pressing and reducing of the particle size are carried out in an atmosphere substantially free of oxygen. By carrying out such processes in a substantially oxygen free atmosphere, formation of an oxide layer on the individual silicon particles is substantially obviated. The presence of an oxide layer substantially prevents direct contact between catalyst and silicon, which may result in a poorer catalysis of the reaction to produce trichlorosilane.

An atmosphere substantially free of oxygen can be achieved, for example, by adding an inert gas or hydrogen during pressing or reducing the particle size. Inert gasses are, for example, nitrogen and/or argon. Hydrogen chloride could also possibly be used since it is a reactant in the next stage of the process, if suitable measures are provided to reduce the leaking hazards of the hydrogen chloride.

The silicon/catalyst mixture can be pre-reacted, for example, with hydrogen chloride, or with hydrogen chloride and hydrogen, before being reacted according to the invention with hydrogen, silicon tetrachloride and, if necessary hydrogen chloride. The silicon/catalyst mixture used according to the exemplary embodiments of the present invention has a concentration between about 25 ppm wt to about 10 weight percent, preferably between about 40 ppm wt to about 1 weight percent catalyst calculated as metal chloride; said weight percent being based on the total weight of silicon/catalyst mixture. It is also possible to use a higher catalyst concentration. The catalysts can be layered within the process such that the alkaline metals salt catalyst is in a heavier concentration downstream in the process and the silicon and iron and copper containing catalysts are in a heavier concentration upstream in the process.

Optionally a secondary alkaline metal or alkaline metal halides can be added, at a concentration of about 5% to about 100% of that of the primary catalysts.

The reaction is carried out, for example, at temperatures from about 200° C. to about 800° C. The reaction is carried out, for example, at a pressure of 0 to 4 MPa (absolute).

The selection of a reactor for the reaction according to the exemplary embodiments of the present invention is not believed to be critical, provided that under the reaction conditions the reactor shows adequate stability and permits the contact of the starting materials with each other. The process can be carried out, for example, in a fluid-bed reactor, fixed bed reactor or a mechanically agitated reactor. A fixed bed reactor utilizing dual catalyst beds with optional catalyst composition in each bed and optionally intermediate hydrogen or hydrogen chloride injection between the two catalyst beds can be used.

During the reaction according to an exemplary embodiment of the invention, hydrogen chloride can be added. The amount of hydrogen chloride can be varied over a wide range. Preferably an amount of hydrogen chloride is added such that a mole ratio of hydrogen chloride to silicon of about 0 to 4:1, preferably about 0.6:1 to about 1.1:1 is obtained.

During the reaction according to another embodiment of the invention, the mole ratio of hydrogen to silicon tetrachloride in the reaction is, for example, about 1:4 to 4:1. A mole ratio of about 1.1:1 to 2:1 is preferred. During the reaction, hydrogen chloride can be added, and the amounts of hydrogen chloride can be varied over a wide range. Preferably an amount of hydrogen chloride is added such that a mole ratio of hydrogen chloride to silicon tetrachloride of about 0 to 4:1, preferably about 0.6:1 to about 1.1:1 is obtained.

The trichlorosilane produced according to the exemplary embodiments herein can be used, for example, for the manufacture of silane, solar-grade or electronics-grade poly-silicon crystals, or a combination thereof. Therein, the exemplary embodiments of the present invention also relate to a method for producing silane and/or poly-silicon crystals on the basis of trichlorosilane obtained according to the methods described herein.

Preferably, the method of the present invention may be integrated into a general method for solar or electronics grade poly-silicon crystals.

The present method according to the present invention may be integrated into a multistage general method for producing poly-silicon crystals, as specified for example in "Economics of Polysilicon Process, Osaka Titanium Co., DOE/JPL 1012122 (1985), 57-78" and comprising the steps of: producing trichlorosilane; disproportioning of trichlorosilane to yield silane; purifying silane to obtain high-purity silane; and thermally decomposing silane in a fluidized-bed reactor and depositing of a resulting hyper-pure silicon on the silicon particles which form a fluidized bed.

In another application, the present invention can be integrated into a method for producing silane and/or solar or electronics grade poly-silicon crystals comprising the steps of: synthesizing trichlorosilane as set forth above and subsequent isolation of the trichlorosilane by distillation and recycling of unreacted silicon tetrachloride, and optionally any unreacted hydrogen of the process; decomposing the trichlorosilane in the presence of hydrogen to obtain high-purity silicon. The decomposing of the trichlorosilane usually occurs at temperatures above 500° C.

In still another application, the present invention can be integrated into a method for producing silane and/or solar or electronics grade poly-silicon crystals comprising the steps of: synthesizing trichlorosilane as set forth above and subsequent isolation of the produced trichlorosilane by distillation and recycling of the unreacted silicon tetrachloride, and optionally any unreacted hydrogen of the process; disproportioning of the trichlorosilane to silane and silicon tetrachloride through the intermediate stages of dichlorosilane and monochlorosilane on alkaline catalysts, preferably catalysts comprised of amino groups, carried out in two apparatuses or in one, and recycling of the produced silicon tetrachloride provided as a high-boiling component into the first reaction area; using of the silane of the purity resulting from the previous step, or purifying the silane until the purity required for the intended purpose is achieved, preferably by distillation, particularly preferred by distillation under pressure. The silane may also be thermally decomposed to obtain high-purity silicon. The decomposing of the silanes usually occurs at temperatures above 500° C.

Apart from thermal decomposition on electrically heated high-purity silicon rods, another suitable method is the thermal decomposition in a fluidized bed comprised of hyper-pure silicon particles. Use of the fluidized bed is particularly desired when the production of solar-grade high-purity silicon is desired. To this aim, trichlorosilane can be mixed with hydrogen gas at a mole ratio of 1:0 to 1:10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A process for preparing trichlorosilane, the process being comprised of the steps of:
    laminating silicon together with one or more catalysts to form a silicon/catalyst laminate;
    subjecting the silicon/catalyst laminate to a size reduction step to form silicon/catalyst particles; and
    reacting the silicon/catalyst particles with hydrogen chloride, or with silicon tetrachloride and hydrogen to produce trichlorosilane.

2. The process according to claim 1, wherein the laminating occurs in a roller press.

3. The process according to claim 1, wherein the size reduction step results in a particle size of about 5 mm or less.

4. The process according to claim 3, wherein the size reduction step results in a particle size of about 0.001 mm to about 1.0 mm.

5. The process according to claim 3, wherein the size reduction step results in a particle size of about 0.2 mm to about 0.6 mm.

6. The process according to claim 1, wherein the size reduction step occurs in a mill comprised of a material wherein particles worn from the mill contribute to a catalysis of a desired reaction.

7. The process according to claim 1, wherein the size reduction step occurs in a mill coated with tungsten carbide.

8. The process according to claim 1, wherein the one or more catalysts are selected from the group consisting of iron, copper, an iron oxide, a copper oxide, an iron salt, a copper salt, and a combination thereof.

9. The process according to claim 1, wherein the silicon/catalyst laminate includes a secondary catalyst in the form of an alkaline metal salt, an alkaline metal halide, or a combination thereof.

10. The process according to claim 9, wherein the one or more catalysts and the secondary catalysts are layered such that during the reacting step, the secondary catalyst in form of the alkaline metal salt is in a heavier concentration downstream, and the silicon and one or more catalysts are in a heavier concentration upstream.

11. The process according to claim 1, wherein the process is carried out at temperatures from about 200 to about 800 degrees C.

12. The process according to claim 1, wherein the process is carried out at a pressure from about 0 to about 4 MPa absolute.

13. The process according to claim 1, wherein the step of laminating the silicon together with the one or more catalysts occurs under an atmosphere of hydrogen, hydrogen chloride, nitrogen, or a combination thereof.

14. The process according to claim 1, wherein the size reduction step occurs under an atmosphere of hydrogen, hydrogen chloride, nitrogen, or a combination thereof.

15. The process according to claim 1, further comprising adding hydrogen chloride such that a mole ratio of hydrogen chloride to silicon tetrachloride is about 0 to 4:1.

16. The process according to claim 1, wherein a mole ratio of hydrogen to silicon tetrachloride is about 1:4 to 4:1.

17. The process according to claim 1, further comprising adding hydrogen chloride such that a mole ratio of hydrogen chloride to silicon tetrachloride is about 0.6:1 to about 1.1:1.

18. The process according to claim 1, wherein a mole ratio of hydrogen to silicon tetrachloride is about 1.1:1 to 2:1.

19. A method for preparing solar grade or electronics grade polycrystalline silicon from trichlorosilane, the method being comprised of the steps of:
    preparing trichlorosilane by:
        laminating silicon together with one or more catalysts to form a silicon/catalyst laminate;
        subjecting the silicon/catalyst laminate to a size reduction step to form silicon/catalyst particles; and
        reacting the silicon/catalyst particles with hydrogen chloride, or with silicon tetrachloride and hydrogen to produce trichlorosilane; and
    using the trichlorosilane to prepare solar grade or electronics grade polycrystalline silicon.

* * * * *